Figure 1:
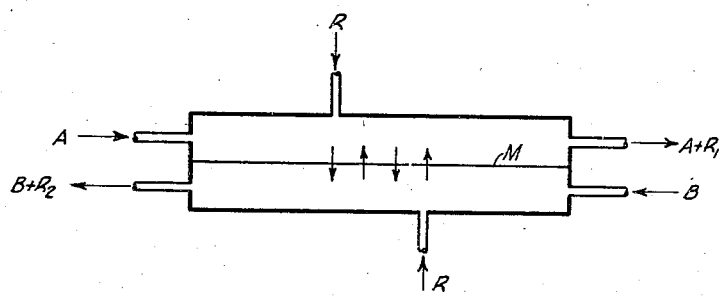

Dec. 3, 1935.  W. J. D. VAN DIJCK  2,023,109

EXTRACTION PROCESS

Filed May 26, 1930

Inventor: Willem Johannes Dominicus Van Dijck
By his Attorney

Patented Dec. 3, 1935

2,023,109

UNITED STATES PATENT OFFICE 2,023,109

EXTRACTION PROCESS

Willem Johannes Dominicus van Dijck, The Hague, Netherlands, assignor to Shell Development Company, San Francisco, Calif., a corporation of Delaware Application May 26, 1930, Serial No. 455,959
In the Netherlands June 3, 1929

28 Claims. (Cl. 196—13)

My invention relates to a process of separating a mixture of liquids into its components.

It is old to separate such mixtures by rectification. Advantage is taken of the fact that the vapour of a mixture of liquids has a composition which in general differs from that of the liquid with which it is in equilibrium. By a suitable application of the principle of counter-current flow of the vapour and liquid phases it is theoretically possible to obtain the various components in a pure state; in practice the theoretically possible result can be approximated only. Heating and cooling play an important part in this process.

It has already been proposed to extract from a mixture of liquids by means of one liquid solvent or a mixture of liquid solvents one component or a group of components. Thus, for instance, it is a general practice in petroleum technology to subject certain petroleum fractions to a treatment with liquid $SO_2$, whereby a group of aromatic constituents is dissolved in the $SO_2$ and can be removed thereby. This and similar processes are, however, not feasible in that it is impossible thereby to attain a complete separation of the various components, in other words they do not lead to a true rectification.

Now the process according to the present invention is based upon the discovery that a true fractionation is quite possible if instead of one, at least two, liquid solvents are used simultaneously. The liquid solvents are conducted counter currently with respect to each other and are so chosen that they are as far as possible mutually non-miscible, whilst further, the proportions in which the various components or groups of components to be removed from the mixture are soluble in the two liquid solvents, preferably should differ as much as possible. In other words, the underlying principle of the present invention is that it is possible to fractionate a mixture of liquid components by subjecting the mixture to the influence of two substantially non-miscible liquid solvents, flowing in contact with the said mixture of liquid components and counter currently with respect to each other, the components or groups of components having different "partition ratios" with respect to the two solvents.

To illustrate this proposition, the separation of $R_1$ from a mixture consisting of $R_1$ and $R_2$ by flowing the solvents A and B counter currently in the mixture, may be described by way of exemplification. As a preliminary observation, it is first pointed out that $R_1$ as well as $R_2$ may be miscible with A in all proportions. Both may be also soluble in B. Both may be more soluble in A than in B or vice versa. But if $R_2$ is more soluble in B than is $R_1$, a method of fractionation is provided according to the present invention. Therefore, with regard to the "partition ratios", it is essential that these values be different in order to effect a fractionation of a mixture of liquid components. As is well known, a solute will distribute itself between two contacting non-miscible solvents at any given temperature in accordance with the following general equation $$\frac{A_{R_1}}{B_{R_1}} = K_1$$

where $A_{R_1}$ is the concentration of the solute $R_1$ in the solvent A, $B_{R_1}$ is the concentration of $R_1$ in the solvent B and $K_1$ is a constant, commonly referred to as a "partition ratio".

Similarly another solute $R_2$ will obey the following relation:

$$\frac{A_{R_2}}{B_{R_2}} = K_2$$

where $A_{R_2}$ is the concentration of $R_2$ in A and $B_{R_2}$ is the concentration of $R_2$ in B, and $K_2$ is the partition ratio. Now in accordance with the present invention it is essential that the values $K_1$ and $K_2$ be different. As used in the claims the term "partition ratio" has the significance indicated above, viz.; the concentration ratio of a solute between two contacting solvents at equilibrium. It is immaterial in what manner the counter current flow is produced. When the liquid solvents are of different specific gravities they may be conducted adjacent to or through each other but it is preferable to conduct them through each other because in this case the greater the difference between the specific gravities of the liquid solvents the better the use that can be made of gravity. Difference in the specific gravities of the liquid solvents is not, however, an essential factor, since the said solvents can also be passed adjacent to each other without making use of gravity, e. g. by conducting the two liquids separated by a diffusion membrane adjacent to each other in a horizontal direction. The function of the diffusion membrane is merely mechanically to separate the streams of liquids. The molecules of all the liquids are, however, able to pass freely through the said diffusion membrane. The modification of the invention in which the liquids are conducted adjacent to each other is illustrated in Figure 1 of the accompanying drawing in which A and B are the liquid solvents, R is the mixture to be separated, $R_1$ and $R_2$ are the components or groups of components to be separated and M is the diffusion membrane.

Figures 2, 3:
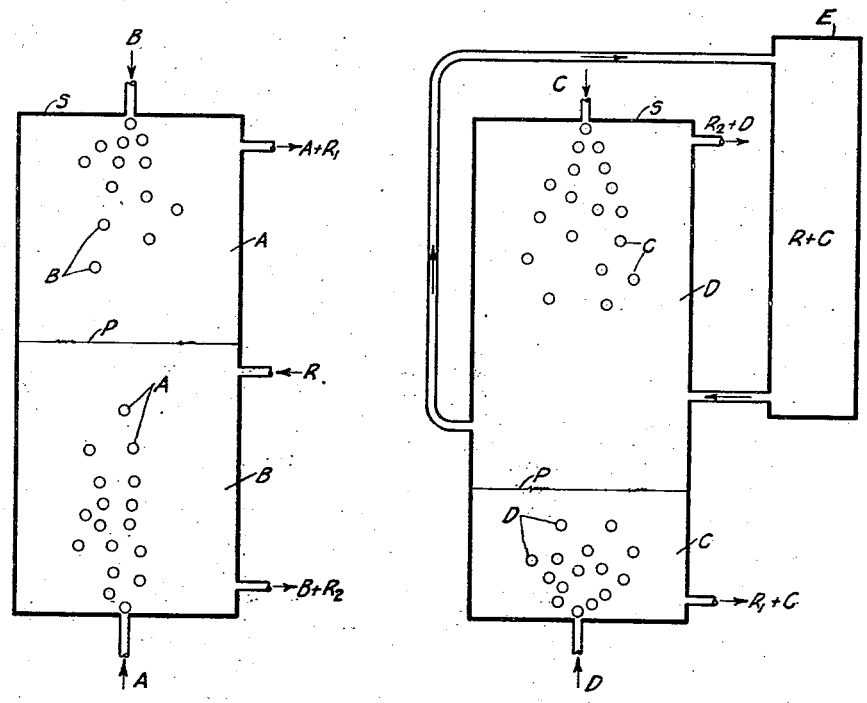

The process according to this invention can be applied continuously or intermittently, and an illustration of each of these two forms will now be given with reference to Figures 2 and 3 of the drawing.

According to the continuous form of the process the mixture runs successively through a number of separators, in which each time one of the components or a group of components is separated. One of these separators is shown in Figure 2 of the drawing in which S is the separator or scrubbing tower, A is the liquid of lower specific gravity and B the liquid of higher specific gravity, P the surface of separation of the two liquid solvents A and B, R the mixture to be split up and $R_1$ and $R_2$ the groups of components to be removed respectively by the liquid solvents A and B. For this purpose the mixture to be split up R may be conducted at a suitably chosen level to a vertical scrubbing tower S filled with a liquid. The filling of the scrubbing tower originally consists of the two immiscible or practically immiscible liquid solvents A and B obtained by introducing at the top of the scrubbing tower the one, and at the bottom the other liquid solvent of lower specific gravity. Now, for instance, when the mixture to be separated into its components is conducted into the scrubbing tower in the middle, it will give up to each of the liquid solvents A and B the components or groups of components $R_1$ and $R_2$ insofar as they are soluble therein. During the passage of the liquid solvents through each other the mixture to be separated is divided into two groups of components. After the heaviest liquid solvent B has passed through the scrubbing tower, it is withdrawn at the bottom together with the component or group of components dissolved therein. Outflowing liquid indicated in Figure 2 by $B+R_2$ will contain little or no $R_1$, because the stream of A, which constantly rises through the stream of $B+R_2$ flowing out at the bottom of the tower S, will continuously wash the component $R_1$ from the down flowing stream, because $R_1$ is more soluble in A than B. Should the liquid flowing out at the bottom of the tower S show any trace of $R_1$, this tendency can be eliminated by increasing the stream of liquid solvent A. In like manner the liquid solvent of lower specific gravity A is withdrawn at the top of the scrubbing tower with the component or components dissolved therein. The liquid solvents may then be separated from the components dissolved thereby by distillation, rectification, freezing or in some other known physical or chemical manner and the liquid solvents thus regenerated can again be circulated. After one desired pure component or group, for example R, has thus been removed, the residue $R_2$ which is further separated into the components it contains, i. e. the original mixture deprived of the said pure component or group $R_1$ and with or without the second liquid solvent B, is then conducted to similar scrubbing towers, in which it is subjected in like manner to the action of the same or other liquid solvents, the separation of the mixture thus being ultimately completed.

According to the intermittent form of the process the desired pure components or groups are separated from a certain quantity of mixture in one and the same apparatus. In this case there is no continuous feed of the mixture to be split up, this being fed in bulk into a reservoir if desired simultaneously with a quantity of one of the liquid solvents miscible with it. The liquid then present in the reservoir is subsequently brought into a scrubbing tower, through which at the same time the two liquid solvents are passed in the manner described above. The liquid from the reservoir can be pumped into the tower at some point, and then drawn off again sometimes containing some of the liquid solvents at some point in close proximity to the point of entrance, modified by the action of the liquid solvents, and returned to the reservoir. The fact that a portion of the liquid solvents may be drawn off together with the modified initial liquid will, however, not disturb the extraction process, since such liquids depending upon their specific gravity will either sink or rise and can be subsequently removed.

The content of the scrubbing tower is thus, in effect, enlarged at the point of contact by that of the reservoir, so that the mixture as a whole comes into contact with the liquid solvents; the various components or groups of components are thus separated from the mixture in the selected liquid solvents, e. g. by a regulation of the velocity of the liquid solvents according to the solubility of the components or groups of components to be separated, drawn off with the respective liquid solvents and further treated as described in the continuous method. The top, the bottom or an intermediate point of the scrubbing tower can be chosen as the point of contact between tower and reservoir. In the first case the components are successively drawn off at the bottom, in the second case at the top. In the third case components dissolved in the corresponding liquid solvent and separated therefrom in known manner are drawn off simultaneously at the top and bottom of the scrubbing tower. The intermittent form of the process is illustrated in Figure 3 of the drawing in which R is the mixture to be separated, C is the liquid solvent of higher specific gravity, D the liquid solvent of lower specific gravity, P the surface of separation of the two liquid solvents C and D, $R_1$ and $R_2$ the components or groups removed by the C and D respectively, E is the reservoir and S the separator or scrubber.

In operating according to this form of the process the mixture R to be separated together with some of the liquid solvent C is brought into the scrubber S in which the liquids C and D are passing through each other, the liquid C of higher specific gravity being introduced at the top of the scrubber and the liquid D of lower specific gravity at the bottom thereof. The mixture R and C having been acted upon by the liquids in the scrubber S is then returned to the reservoir E. By carefully regulating the quantities of C and D and by maintaining a predetermined pumping velocity of the mixture $R+C$, only $R_1$ is removed by the liquid solvent C, because although $R_2$ is substantially soluble in C the solubility of $R_2$ in D is still greater and by carefully regulating the quantity of D which runs through the tower S even the last traces of $R_2$ will be removed by the ascending liquid D. Since, however, only a limited quantity of the mixture R is present in the scrubber S it will take several hours before the total quantity has been circulated and the component $R_1$ removed. During this period the component $R_1$ is gradually removed, while at the same time some of $R_2$ is removed by D at the top of the tower S, leaving in the reservoir the remainder of the component $R_2$. On continuing the extraction a solution of $R_2$ in C then circulates and since the solubility of $R_2$ in D is greater than in C the remainder of the component R₂ will eventually leave the scrubber with the liquid D.

As the extraction is always carried out with a limited quantity of the two liquid solvents C and D these are recovered and recirculated in the scrubber S. As long as the extraction is carried out under the same conditions C will only remove R₁ and D only R₂ other components or groups of components not being eliminated during the process. The possibility is, however, not excluded that finally the components R₁ and R₂ may be again further separated possibly even with the same liquid solvents but under different conditions.

If a single combination of liquid solvents does not bring about a sufficient separation, the groups R₁ and R₂ of similar components not yet separated can be subjected to the action of other liquid solvents in a second apparatus.

A good idea of the process according to the invention can be obtained by comparing it with that taking place in a rectifying column. In the present process, instead of the vapour phase, which differs in composition from the liquid phase, there arises a second liquid phase, likewise differing from the first with regard to the concentration of the components to be separated. As in the case of rectification, the degree of separation is governed by the extent of the contact surface between the two phases, the quantities of the phases passed through per unit of time, and the mutual proportions thereof, as also by the measures taken in order to prevent components once separated, being again mixed with each other. An essential point of difference is, however, that in the process according to the invention, separation depends on the difference in solubility of the components to be separated, instead of a difference in volatility, and as a result the process is more flexible, and it is possible by varying the choice of the liquid solvents to carry out the separation in various manners.

Finally, it should be noted that as one of the liquid solvents a component or group of components already present in the mixture to be separated may be used, and also that it is not always necessary to pass the two liquid solvents in countercurrent throughout the whole length of the tower.

Since my invention is a basically novel method of fractionation, it may be carried into practice without any limitation as to the mixtures to be split up or the auxiliary liquids to be employed, which latter should be determined by practical experiments in any given case. However, in order to illustrate my invention more fully with regard to the auxiliary liquids to be employed I may say that mixtures of hydrocarbons, especially of the heavy type such as lubricating oils may be fully fractionated with the aid of benzine and liquid sulphur dioxide according to my invention as described hereinbefore. Mixtures of lighter hydrocarbons such as for example lamp oil, gas oil, light lubricating fractions etc. may be fully fractionated with methyl alcohol and carbon disulphide.

The term "fractionating" as used in the claims means the process of separating the various components or groups of components of the original mixture of liquid components from each other, or in other words, it means simply the process of resolving the original mixture into its component parts, so as to obtain pure substances or groups of closely related substances.

The terms "a component" or "a pure component" as used in the claims include pure substances and a group of closely related substances.

What I claim is:

1. A process of fractionating a mixture of liquid components which comprises subjecting the said mixture to the action of two counterflowing mutually non-miscible liquid solvents, the said solvents being so selected that the components of the liquid mixture have different partition ratios with respect to the said solvents and recovering the said solvents containing at least partially fractionated components of the original mixture.

2. A process of fractionating a mixture of liquid components which comprises subjecting the said mixture to the action of two counterflowing mutually non-miscible liquid solvents of different specific gravities, the said solvents being so selected that the components of the liquid mixture have different partition ratios with respect to the said solvents and recovering the said solvents containing at least partially fractionated components of the original mixture.

3. A process of fractionating a mixture of liquid components which comprises subjecting the said mixture to the action of two counterflowing mutually non-miscible liquid solvents of different specific gravities, one of said liquid solvents being miscible with the said mixture, the said solvents being so selected that the components of the liquid mixture have different partition ratios with respect to the said solvents and recovering the said solvents containing at least partially fractionated components of the original mixture.

4. A process of fractionating a mixture of liquid components which comprises subjecting the said mixture to the action of two counterflowing mutually non-miscible liquid solvents of different specific gravities, both of said solvents being miscible with the said mixture, the said solvents being so selected that the components of the liquid mixture have different partition ratios with respect to the said solvents and recovering the said solvents containing at least partially fractionated components of the original mixture.

5. A process of fractionating a mixture of liquid components which comprises subjecting the said mixture to the action of two counterflowing mutually non-miscible liquid solvents, one of the liquid solvents having a greater dissolving action than the other of said liquid solvents for at least one of the components of the said mixture of liquid components, in such a manner that one of the solvents containing components of the original mixture of liquid components encounters the other solvent in substantially pure state, whereby the second named solvent progressively extracts one component from the first named solvent, until at least one solvent contains only one pure component of the original mixture of liquid components, and separately recovering the said solvents, one of which contains a substantially pure component of the original mixture of liquid components.

6. A process of fractionating a mixture of liquid components which comprises subjecting the said mixture to the action of liquid solvents by forcing two mutually non-miscible liquid solvents to flow adjacently and countercurrently to each other in a confined body of the said liquid mixture, one of the liquid solvents having a greater dissolving action than the other of said liquid solvents for at least one of the components of the said mixture of liquid components, in such a manner that one of the solvents containing components of the original mixture of liquid components encounters the other solvent in substantially pure state, whereby the second named solvent progressively extracts one component from the first named solvent, until at least one solvent contains only one pure component of the original mixture of liquid components, and separately recovering the said solvents, one of which contains a substantially pure component of the original mixture of liquid components.

7. A process of fractionating a mixture of liquid components, which comprises subjecting the said mixture to the action of liquid solvents by forcing two mutually non-miscible, liquid solvents to flow adjacently and countercurrently to each other in a confined body of the said liquid mixture, the said solvents being so selected that the liquid components or a certain group of components of the mixture have different partition ratios with respect to the said solvents, and recovering the said solvents containing at least partially fractionated components of the original mixture.

8. A process of fractionating a mixture of liquid components, which comprises subjecting the said mixture to the action of liquid solvents by forcing two mutually non-miscible liquid solvents to flow adjacently and countercurrently to each other in a confined body of the said liquid mixture, one of said solvents being miscible with the said mixture, the said solvents being so selected that the liquid components or a certain group of components of the mixture have different partition ratios with respect to the said solvents, and recovering the said solvents containing at least partially fractionated components of the original mixture.

9. A process of fractionating a mixture of liquid components, which comprises subjecting the said mixture to the action of liquid solvents by forcing two substantially non-miscible, liquid solvents to flow adjacently and countercurrently to each other in a confined body of the said liquid mixture, both of said solvents being miscible with the said mixture, the said solvents being so selected that the liquid components or a certain group of components of the mixture have different partition ratios with respect to the said solvents, and recovering the said solvents containing at least partially fractionated components of the original mixture.

10. In a process for separating mineral oil containing paraffinic and naphthenic constituents, into fractions respectively more paraffinic and more naphthenic than the original oil, the steps comprising counterflowing two solvents adapted to form separate layers when in contact with each other, one of said solvents having a greater solvent power for naphthenic than for paraffinic oils and the other of said solvents having a greater solvent power for paraffinic than for naphthenic oils, together with the step of bringing a mineral oil into contact with the said counter-flowing paraffinic and naphthenic solvents.

11. In a process of separating mineral oil containing paraffinic and naphthenic constituents into fractions respectively more paraffinic and more naphthenic than the original oil, the steps comprising counterflowing a selective solvent for naphthenic constituents and a selective solvent having a greater solvent power for paraffinic constituents than the first solvent, which when mixed with the oil form separate layers, together with the step of bringing the mineral oil into contact with the said counterflowing solvents.

12. In a process of separating mineral oil containing paraffinic and naphthenic constituents into fractions respectively more paraffinic and more naphthenic than the original oil, the steps comprising counterflowing a selective solvent for naphthenic constituents and a selective solvent for paraffinic constituents, which when mixed with each other form separate layers, together with the step of bringing the mineral oil into contact with the said counterflowing solvents.

13. In a process of separating mineral oil containing paraffinic and naphthenic constituents into fractions respectively more paraffinic and more naphthenic than the original oil, the steps comprising counterflowing liquid sulfur dioxide and a light liquid hydrocarbon having the solvent properties of gasoline, together with the step of bringing a mineral oil into contact with the said counterflowing solvents.

14. In a process of separating mineral oil containing paraffinic and naphthenic constituents into fractions respectively more paraffinic and more naphthenic than the original oil by means of two solvents, each of which when brought into contact with the oil selectively dissolves one of said constituents, the steps comprising counterflowing the two solvents and bringing the oil into contact with the counterflowing solvents.

15. The process of claim 14 wherein one of the solvents is miscible with the mixture being treated.

16. In a process of separating mineral oil containing paraffinic and naphthenic constituents into fractions respectively more paraffinic and more naphthenic than the original oil, the steps of continuously subjecting a stream of the oil simultaneously to the extracting action of the two counterflowing solvents, which when mixed with the oil form separate liquid oil-containing phases, the composition of the oil in one phase being different from that in the other phase.

17. In a process of separating mineral oil containing paraffinic and naphthenic constituents into fractions respectively more paraffinic and more naphthenic than the original oil, the steps comprising continuously subjecting a stream of the oil to the extracting action of a selective solvent for some of its constituents and simultaneously subjecting the mixture of oil and solvent in counterflow to the extracting action of a second selective solvent for some of the other constituents of the oil.

18. In a solvent extraction process for separating mineral oil into two portions the steps comprising counterflowing two solvents adapted to form separate layers when in contact with each other, one of said solvents having a greater solvent power for one portion of the oil and the other of said solvents having a greater solvent power for the other portion of the oil, together with the step of bringing the mineral oil into contact with the said counterflowing solvents.

19. In a solvent extraction process for separating mineral oil into two portions by means of two at least partially immiscible solvents, which when mixed with the oil form separate layers, the steps of counterflowing the two solvents and subjecting the mineral oil to the extractive action of the said counterflowing solvents.

20. In a process of separating mineral oil containing paraffinic and naphthenic constituents into fractions respectively more paraffinic and more naphthenic than the original oil, the steps of continuously subjecting a stream of oil simultaneously to the extracting action of two counterflowing solvents of such a nature that two liquid phases are formed when one of said solvents is added to a homogeneous liquid phase containing oil and the other solvent.

21. In a solvent extraction process for separating a mixture of liquid components into two portions by means of two at least partially immiscible solvents, which when mixed with the said mixture form separate layers, the steps of introducing the two solvents into an extraction zone at different points thereof, counterflowing the two solvents within the extraction zone between the said points, and subjecting the said mixture to the extractive action of the said counterflowing solvents by introducing it into the extraction zone at a point between said two points.

22. In a solvent extraction process for separating a hydrocarbon mixture into two portions by means of two at least partially immiscible solvents, which when mixed with the mixture form separate layers, the steps of introducing the two solvents into an extraction zone at different points thereof, counterflowing the two solvents within the extraction zone between the said points, and subjecting the said mixture to the extractive action of the said counterflowing solvents by introducing it into the extraction zone at a point between said two points.

23. In a solvent extraction process for separating a mineral oil containing paraffinic and naphthenic constituents into fractions respectively more paraffinic and more naphthenic than the original oil by means of two solvents, each of which when brought into contact with the oil selectively dissolves one of said constituents, the steps of introducing the two solvents into an extraction zone at different points thereof, counterflowing the two solvents within the extraction zone between the said points, and subjecting the said oil to the extractive action of the said counterflowing solvents by introducing it into the extraction zone at a point between said two points.

24. In the extraction process for separating a liquid mixture into two portions by means of two solvents adapted to form separate layers when in contact with each other, one of said solvents having a greater solvent power for one portion of the mixture and the other of said solvents having a greater solvent power for the other portion of the mixture, the steps of introducing the two solvents separately into an extraction zone at different points thereof, counterflowing the two solvents within the extraction zone between the said points, one of the solvents passing only through a portion of the extraction zone, and subjecting the said mixture to the extraction action of the said counterflowing solvents by introducing it into the extraction zone at a point between said two points.

25. In the extraction process for separating hydrocarbon oil into two portions by means of two solvents adapted to form separate layers when in contact with each other, one of said solvents having a greater solvent power for one portion of the oil and the other of said solvents having a greater solvent power for the other portion of the oil, the steps of introducing the two solvents separately into an extraction zone at different points thereof, counterflowing the two solvents within the extraction zone between the said points, one of the solvents passing only through a portion of the extraction zone, and subjecting the said oil to the extraction action of the said counterflowing solvents by introducing it into the extraction zone at a point between said two points.

26. In a solvent extraction process for separating a mixture of liquid components into two portions by means of two at least partially immiscible solvents which, when mixed with said mixture, form separate layers, the steps of introducing the two solvents into an extraction zone at different points thereof, counterflowing the two solvents within the extraction zone between the said points, subjecting the said mixture to the extractive action of the said counterflowing solvents by introducing it into the extraction zone at a point between said two points, and withdrawing at least one of the solvents and components dissolved therein from the extraction zone at a point adjacent to the point of introduction of the other solvent.

27. In a solvent extraction process for separating a hydrocarbon mineral oil mixture into two portions by means of two at least partially immiscible solvents which, when mixed with the hydrocarbon mixture, form separate layers, the steps of introducing the two solvents into an extraction zone at different points thereof, counterflowing the two solvents within the extraction zone between said points, subjecting the said hydrocarbon mixture to the extractive action of the said counterflowing solvents by introducing it into the extraction zone at a point between said two points, and withdrawing at least one of the solvents and components dissolved therein from the extraction zone at a point adjacent to the point of introduction of the other solvent.

28. In a solvent extraction process for separating a hydrocarbon mineral oil mixture into two portions by means of two at least partially immiscible solvents which, when mixed with the hydrocarbon mixture, form separate layers, the first of said solvents being a selective solvent for certain components of said hydrocarbon mixture, and the second solvent being capable of dissolving other components of said hydrocarbon mixture, the steps of introducing the two solvents into an extraction zone at different points thereof, counterflowing the two solvents within the extraction zone between said points, subjecting the said hydrocarbon mixture to the extractive action of the said counterflowing solvents by introducing it into the extraction zone at a point between said two points, withdrawing said first solvent and components dissolved therein from the extraction zone at a point adjacent to the point of introduction of said second solvent, and withdrawing the said second solvent and components dissolved therein from the extraction zone at a point adjacent to the point of introduction of said first solvent.

WILLEM JOHANNES DOMINICUS VAN DIJCK.